United States Patent [19]
Shimada

[11] 3,942,599
[45] Mar. 9, 1976

[54] APPARATUS FOR SUPPORTING CATALYTIC CONVERTERS ON MOTOR CARS

[75] Inventor: Yukio Shimada, Yokohama, Japan

[73] Assignee: Nissan Motor Company Limited, Yokohama, Japan

[22] Filed: July 11, 1974

[21] Appl. No.: 487,657

[30] Foreign Application Priority Data
July 13, 1973   Japan .............................. 48-83204

[52] U.S. Cl. ............... 180/64 A; 248/54 R; 248/60; 248/62; 248/74 R
[51] Int. Cl.² ......................................... B60K 13/04
[58] Field of Search .......... 180/64 A, 57; 248/54 R, 248/58, 60, 62, 65, 74 R, 72

[56] References Cited
UNITED STATES PATENTS

| | | |
|---|---|---|
| 2,081,546 | 5/1937 | MacPherson ..................... 180/64 A |
| 2,160,808 | 6/1939 | Bradley ............................. 180/64 A |
| 2,841,232 | 7/1958 | Loeffler ....................... 180/64 A X |
| 2,842,218 | 7/1958 | Bradbury ......................... 180/64 A |
| 2,912,198 | 11/1959 | Feil, Jr. ......................... 180/64 A X |
| 2,981,351 | 4/1961 | Knickerbocker et al. ......... 180/64 A |
| 3,219,138 | 11/1965 | Kishline ............................... 180/57 |

*Primary Examiner*—M. H. Wood, Jr.
*Assistant Examiner*—Milton L. Smith

[57] ABSTRACT

A catalytic converter installed in the exhaust system of an engine of a motor car is mounted on a member arranged to vibrate substantially integrally with the engine through a bracket and a cushion member.

6 Claims, 8 Drawing Figures

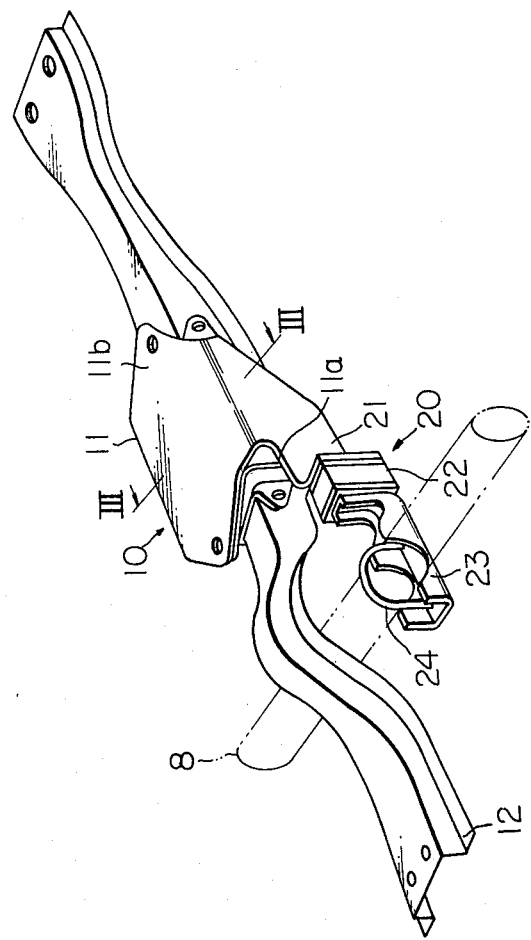

APPARATUS FOR SUPPORTING CATALYTIC CONVERTERS ON MOTOR CARS

BACKGROUND OF THE INVENTION

This invention relates to apparatus for supporting a catalytic converter for use on motor cars.

A catalytic converter connected in series with an exhaust pipe of a motor car engine for purifying the exhaust gas has heretofore been mounted on a structural member of the car body, for example the floor plate, by means of a suitable supporting member, such as a hanger. Since the weight of the catalytic converter is substantial, the vibrations of the converter caused by the vibrations or shocks of the car which are generated by the running of the car are transmitted directly to the car body thus giving unpleasant feeling to the driver and those riding on the car. Moreover, as the mode of vibration of the catalytic converter is different from that of the engine of the motor car, an exhaust pipe used to interconnect the engine and the catalytic converter will be subjected to extremely complicated forces thereby damaging the exhaust pipe. Where the vibrations from the engine and car body cause the catalytic converter to resonate to its natural frequency, the amplitude of the vibration of the converter would be increased thus causing undue wear and shortening of the useful life of the catalyst contained in the converter.

SUMMARY OF THE INVENTION

It is an object of this invention to provide improved apparatus for supporting a catalytic converter capable of preventing damage to the exhaust pipe associated with the catalytic converter and wear of the catalyst due to vibration.

Another object of the invention is to provide a novel supporting apparatus for the catalytic converter capable of preventing transmission of the vibration of the catalytic converter to the car body and the driver of the motor car.

According to this invention there is provided apparatus for supporting a catalytic converter installed in the exhaust system of an engine of a motor car, comprising a member which is arranged to vibrate substantially integrally with the engine, and a cushion member and a bracket for mounting the catalytic converter on the member.

BRIEF DESCRIPTION OF THE DRAWINGS

In the accompanying drawings:

FIG. 2 shows a perspective view, of the essential elements of the embodiment shown in FIG. 1;

DESCRIPTION OF THE PREFERRED EMBODIMENTS

Figure 1:
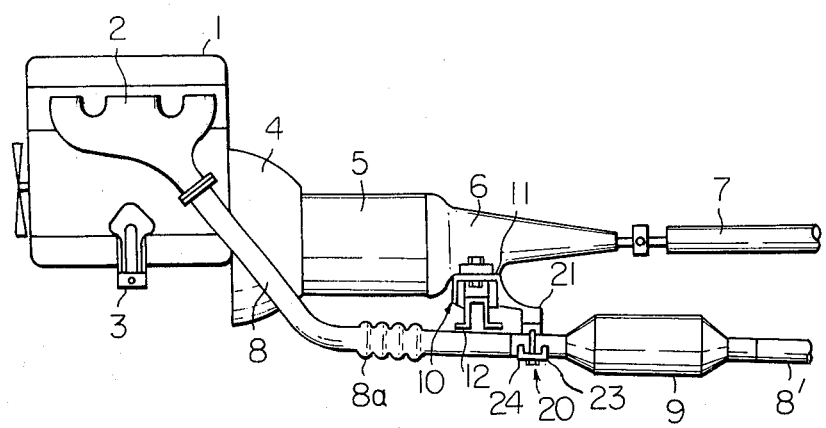
FIG. 1 shows a side elevation, partly in section, of an engine and a catalytic converter embodying the invention.

Referring now to FIG. 1, the exhaust gas from an internal combustion engine 1 mounted on a motor car is exhausted into the atmosphere via an exhaust manifold 2, exhaust pipes 8 and 8' and a catalytic converter 9 connected between pipes 8 and 8' and containing a suitable catalyst for converting harmful combustion products into non-harmful compounds. A portion 8a of pipe 8 is constructed to be flexible. The engine 1 is mounted on the car body, not shown, by means of resilient mounting fixtures 3 and the engine power is transmitted to a propeller shaft 7 via a clutch 4, a transmission gearing 5 and an extension 6 of the gear casing. Although not shown in the drawing the exhaust pipe 8' is supported by the floor plate of the car body by suitable resilient supporting means, not shown. The catalytic converter 9 is mounted on a beam 12 secured to the car body through a mounting member 10 including a heat insulating member 11 having a U-shaped cross-section and supporting the extension 6 of the gear casing as shown in FIG. 1.

Figure 3:
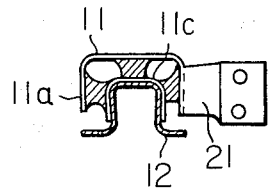
FIG. 3 is a partial sectional view of the assembly shown in FIG. 2 taken along a line III—III.

As shown in FIGS. 2 and 3 the member 11 is resiliently mounted on the beam 12 through cushion members 11a made of rubber or other resilient material, and a supporting fixture 23 for holding exhaust pipe 8 is connected to a bracket 21 integral with the member 11 via a cushion member 22 made of rubber for example.

Figure 4:
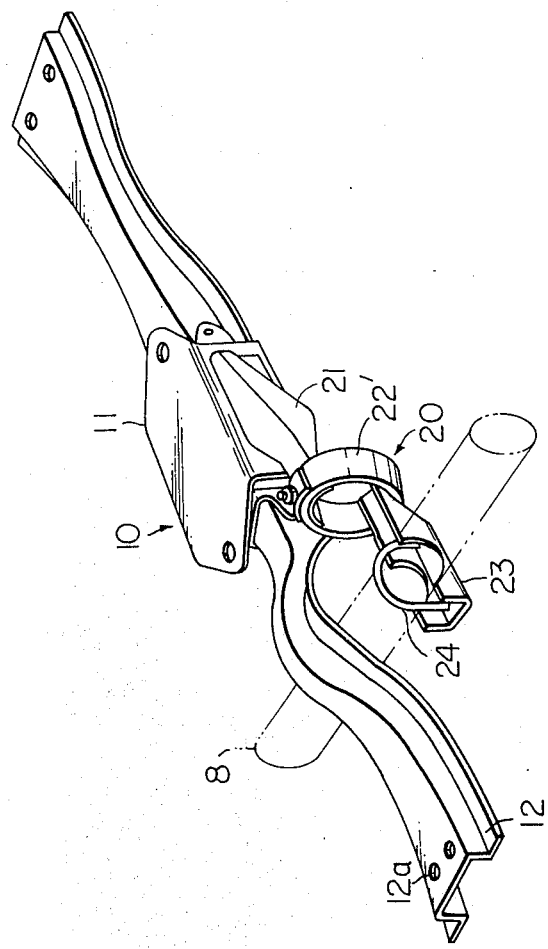
FIG. 4 shows a perspective view of a modified embodiment of this invention.

In the modification shown in FIG. 4, the supporting fixture 23 is secured to the bracket 21 through an annular heat insulator 22' made of a resilient member such as spring steel.

Instead of providing bracket 21 integrally with the member 11 these members may be provided on the extension 6 of the gear casing.

Since the catalytic converter 9 is mounted on a member 11 which vibrates integrally with the engine through a cushion member 22 or 22', the catalytic converter 9 vibrates substantially integrally with the engine without being influenced by the vibration of the car body. Accordingly, it is possible to prevent not only application of undue force upon the catalytic converter but also undesirable resonance thereof. Since the vibration of the catalytic converter is transmitted indirectly to the car body through cushion members 22 or 22', and cushion members 11a of member 11 or the resilient engine mounting fixtures 3 and since the inertia of the assembly of engine 1, clutch 4, transmission gearing 5 and the extension 6 of the gear case is large, it is possible to substantially prevent transmission of the vibration of the catalytic converter 9 to the car body. The cushion member 22 or 22' cooperates with the flexible portion 8a of the exhaust pipe to alleviate large high frequency components of the vibration of the engine which would otherwise be transmitted to the container 9. This arrangement is advantageous for a container which contains particular catalyst which is liable to be damaged by vibration. As shown in FIG. 4, where a cushion member 22' made of relatively stiff annular spring steel is combined with a rigid bracket 21 it is possible to vibrate the catalytic converter 9 substantially integrally with the engine so that it is possible to reduce the vibration proofness of the exhaust pipe 8 thus making it possible to eliminate the flexible portion 8a. This arrangement is advantageous for a monolythic catalytic converter which is less susceptible to shocks and vibrations.

Figure 5:
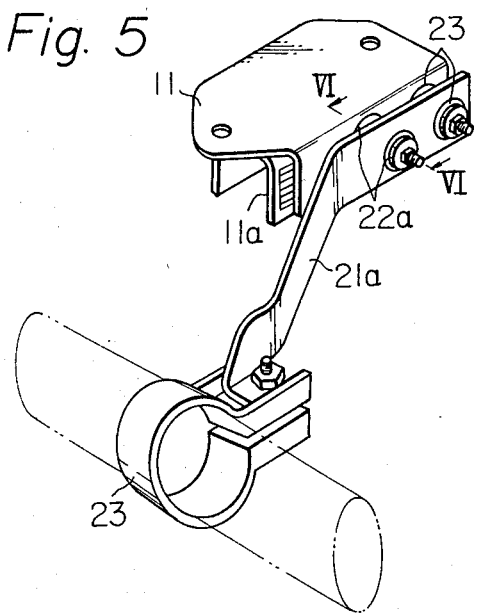
FIGS. 5 and 7 are perspective views similar to FIG. 2 illustrating other modifications of this invention.
Figure 6:
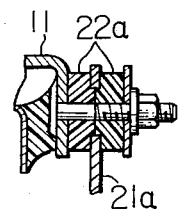
FIG. 6 is a partial sectional view of the embodiment shown in FIG. 5 taken along a line VI—VI.
Figure 7:
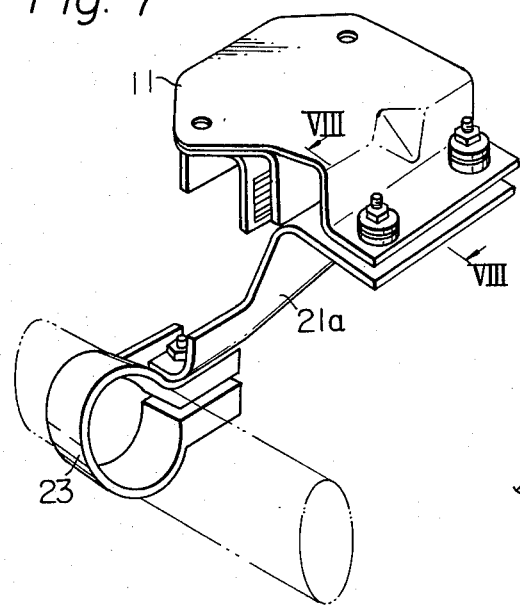
Figure 8:
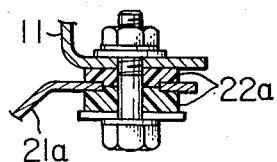
FIG. 8 is a partial sectional view of the modification shown in FIG. 7 taken along a line VIII—VIII.

In another modification shown in FIGS. 5 and 6 bracket 21a supporting the supporting fixture 23 is mounted on one side surface of the U shaped member 11 through cushion members 22a of rubber, whereas in still further modification shown in FIGS. 7 and 8 the bracket 21a is mounted on the lower side of the member 11 through cushion members 22a.

What is claimed is:

1. In a motor vehicle having an engine and a transmission gear box supported through cushion means on a beam secured to the body of said vehicle, and an exhaust system having a catalytic converter operatively connected to an exhaust manifold of said engine through an exhaust pipe, the improvement comprising:
   a basic member interposed between said transmission gear box and said cushion means and secured to said transmission gear box so that said basic member is vibrated substantially integrally with said engine;
   a cushion member; and
   an exhaust pipe holding member having one end connected to said basic member through said cushion member, and the other end securing said exhaust pipe.

2. The improvement as claimed in claim 1, in which said exhaust pipe holding member includes:
   a bracket secured at its one end to said cushion member; and
   an annular member connected to said bracket to fasten said exhaust pipe to said bracket.

3. The improvement as claimed in claim 2, in which said cushion member comprises an annular ring of a resilient member.

4. the improvement as claimed in claim 2, in which said basic member has an inverted U-shaped cross section and is mounted on said beam through said cushion means.

5. The improvement as claimed in claim 1, in which said basic member has an inverted U-shaped cross section and is mounted on said beam through said cushion means and said cushion member is made of a rubber, and in which said exhausted pipe holding member includes a bracket secured at its one end to said basic member through said cushion member, and a ring shaped fixing member secured to the other end of said bracket for fastening said exhaust pipe.

6. In a motor vehicle having an engine and a transmission gear box supported through cushion means on a beam secured to the body of said vehicle, and an exhaust system having a catalytic converter operatively connected to an exhaust manifold of said engine through an exhaust pipe, the improvement comprising:
   a basic member having a generally U-shaped cross section mounted on said cushion means, said basic member being interposed between said transmission gear box and said beam, and secured to said transmission gear box so that said basic member is vibrated substantially integrally with said engine;
   a cushion member including a ring-shaped metal spring having an upper end connected to said basic member through a first bracket; and
   an exhaust pipe holding member including a second bracket secured at its one end to a lower end of said ring-shaped metal spring, and an U-shaped fastening member connected to the other end of said second bracket in order to fasten a portion of said exhaust pipe adjacent said catalytic converter to said second bracket.

* * * * *